(12) United States Patent
Han et al.

(10) Patent No.: US 9,942,000 B2
(45) Date of Patent: Apr. 10, 2018

(54) BROADCAST RECEIVING APPARATUS AND SIGNAL PROCESSING METHOD THEREOF

(71) Applicant: SAMSUNG ELECTRONICS CO., LTD., Suwon-si (KR)

(72) Inventors: Yun-kyoung Han, Suwon-si (KR); Suk-in Min, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/229,732

(22) Filed: Aug. 5, 2016

(65) Prior Publication Data

US 2017/0041156 A1 Feb. 9, 2017

(30) Foreign Application Priority Data

Aug. 5, 2015 (KR) .................. 10-2015-0110401
Jan. 7, 2016 (KR) .................. 10-2016-0002196

(51) Int. Cl.
*H04L 1/00* (2006.01)
*H04L 12/18* (2006.01)

(52) U.S. Cl.
CPC ........ *H04L 1/0039* (2013.01); *H04L 12/1836* (2013.01)

(58) Field of Classification Search
CPC ... H04B 7/2603; H04B 7/2612; H04L 1/0036; H04L 1/0039; H04L 1/0045; H04L 1/0047; H04L 1/005; H04L 1/0054; H04L 12/18; H04L 12/1836; H04L 12/1845; H04L 27/2647; H04L 27/2649; H04L 27/2655

USPC ....... 375/260, 262, 265, 316, 324, 340, 341, 375/354; 370/310, 349, 350, 352, 356, 370/389, 392; 455/503, 323, 334, 337
See application file for complete search history.

(56) References Cited

U.S. PATENT DOCUMENTS

| | | | |
|---|---|---|---|
| 2010/0251078 A1 | 9/2010 | Yokokawa et al. | |
| 2011/0164703 A1 | 7/2011 | Yokokawa et al. | |
| 2013/0291027 A1* | 10/2013 | Hwang | H04N 21/6131 725/62 |
| 2015/0036689 A1* | 2/2015 | Hwang | H04L 69/16 370/392 |
| 2015/0078473 A1* | 3/2015 | Ko | H04L 1/0042 375/267 |
| 2015/0092883 A1* | 4/2015 | Hwang | H04L 27/2602 375/295 |

(Continued)

FOREIGN PATENT DOCUMENTS

| | | |
|---|---|---|
| EP | 2 224 635 A2 | 9/2010 |
| EP | 2 268 004 A2 | 12/2010 |
| JP | 2010-226474 A | 10/2010 |

(Continued)

*Primary Examiner* — Young T Tse
(74) *Attorney, Agent, or Firm* — Sughrue Mion, PLLC

(57) ABSTRACT

A broadcast receiving apparatus and a signal processing method thereof are provided. The broadcast receiving apparatus includes a receiver configured to receive a data stream comprising a plurality of physical layer pipes (PLPs); a demodulator configured to output at least one generic packet corresponding to each of the plurality of PLPs and additional information on the at least one generic packet by demodulating the plurality of PLPs; and a signal processor configured to process the at least one generic packet based on the output additional information.

15 Claims, 17 Drawing Sheets

(56) References Cited

U.S. PATENT DOCUMENTS

2015/0113584 A1\* 4/2015 Herrmann ............ H04N 21/235
                                                                             725/116

FOREIGN PATENT DOCUMENTS

| JP | 2011-142421 A | 7/2011 |
| JP | 2014-96814 A | 5/2014 |
| KR | 10-2009-0074683 A | 7/2009 |
| KR | 10-2010-0130560 A | 12/2010 |

\* cited by examiner

BROADCAST RECEIVING APPARATUS AND SIGNAL PROCESSING METHOD THEREOF

CROSS-REFERENCE TO RELATED APPLICATIONS

This application claims priority from Korean Patent Application Nos. 10-2015-0110401 and 10-2016-0002196, respectively filed on Aug. 5, 2015 and Jan. 7, 2016, in the Korean Intellectual Property Office, the disclosure of which is incorporated herein by reference in its entirety.

BACKGROUND

Field

Apparatuses and methods consistent with exemplary embodiments relate to a broadcast receiving apparatus and a signal processing method thereof, and more particularly, to a broadcast receiving apparatus and a signal processing method for receiving an image signal suitable for a digital broadcast standard.

Description of the Related Art

In $21^{st}$ century information society, broadcast communication services have faced times of digitization, multi-channelization, broadband, and high quality. With the advent of various broadcast receiving devices, e.g., a high-quality digital TV and a Portable Multimedia Player (PMP), digital broadcast servers need to support of various different requirements according to the receiving methods.

Many standard groups have established various standards and have tried to provide various services for satisfying user needs. Accordingly, there is a need to develop a broadcast receiving apparatus which supports such standards for providing various services.

SUMMARY

Exemplary embodiments may overcome the above disadvantages and other disadvantages not described above. However, the present disclosure is not necessarily required to overcome the disadvantages described above.

The exemplary embodiments provide a broadcast receiving apparatus and a signal processing method thereof, which are suitable for the broadcast standard for providing various broadcast services.

According to an aspect of an exemplary embodiment, there is provided a broadcast receiving apparatus including: a receiver configured to receive a data stream including a plurality of physical layer pipes (PLPs); a demodulator configured to output at least one generic packet corresponding to each of the plurality of PLPs and additional information on the at least one generic packet by demodulating the plurality of PLPs; and a signal processor configured to process the at least one generic packet based on the output additional information.

The additional information may include information used to restore a payload of the at least one generic packet or to perform a signal process on a signal in an upper layer of a physical layer.

The additional information may include at least one of sync code information indicating start of the generic packet, valid information indicating whether output time of multimedia data of the generic packet is valid, error information, identification information of each of the plurality of PLPs, and rank information indicating a sequence of each of the plurality of PLPs.

Each of the sync code information, the valid information, the error information, the identification information, and the rank information is allocated with a specific bit within 1 byte.

The additional information may further include time information for output of the multimedia data of the generic packet; and the time information is allocated with one or more bits within 6 bytes.

The broadcast receiving apparatus may further include first and second interfaces configured to output data to the signal processor, wherein the demodulator is further configured to insert the additional information of the generic packet into the generic packet, outputs at least one of the generic packet with the additional information inserted thereto, clock information, and valid information to the first interface, and outputs sync information indicating start of the generic packet with the additional information inserted thereto to the second interface.

The broadcast receiving apparatus may further include first and second interfaces configured to output data to the signal processor, wherein the demodulator is further configured to output at least one of the generic packet, clock information and valid information to the first interface, and output at least one of sync information indicating start of the generic packet and additional information on the generic packet to the second interface.

The signal processor is further configured to decode a generic packet of the additional information at different decoding processing levels according to error information included in the additional information.

According to an aspect of an exemplary embodiment, there is provided a signal processing method of a broadcast receiving apparatus, the method including: receiving a data stream including a plurality of physical layer pipes (PLPs); outputting at least one generic packet corresponding to each of the plurality of PLPs and additional information on the at least one generic packet by demodulating the plurality of PLPs; and processing the at least one generic packet based on the additional information.

The additional information may include information used to restore a payload of the at least one generic packet or to perform a signal process on a signal in an upper layer of a physical layer.

The additional information may include at least one of sync code information indicating start of the generic packet, valid information indicating whether output time of multimedia data of the generic packet is valid, error information, identification information of each of the plurality of PLPs, and rank information indicating a sequence of each of the plurality of PLPs.

Each of the sync code information, the valid information, the error information, the identification information, and the rank information is allocated with a specific bit within 1 byte.

The additional information may further include time information for output of the multimedia data of the generic packet, and the time information is allocated with one or more bits within 6 bytes.

The outputting may include: inserting additional information of the generic packet into the generic packet; outputting at least one of the generic packet with the additional information inserted thereto, clock information, and valid information through the first interface; and outputting sync information indicating start of the generic packet with the additional information inserted thereto through the second interface.

The outputting may include: outputting at least one of the generic packet related data, clock information, and valid information through the first interface; and outputting at least one of sync information indicating start of the generic packet and additional information on the generic packet through the second interface.

The processing may include decoding a generic packet of the additional information at different decoding processing levels according to error information included in the additional information.

The processing includes decoding a generic packet of the additional information at different decoding processing levels according to error information included in the additional information.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE EXEMPLARY EMBODIMENTS

Figure 1:
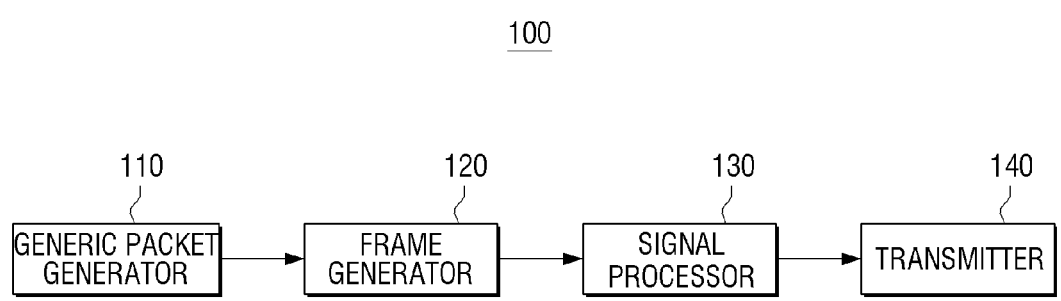
FIG. 1 is a block diagram illustrating a configuration of a broadcast transmitting apparatus according to an exemplary embodiment.

The terms used in the present specification are defined in consideration of functions used in the present specification, and can be changed according to the intent, conventionally used methods of operators, or advent of new technologies. In specific cases, the terms can be selected by an application. In this case, the meaning of the terms will be described in a corresponding exemplary embodiment. Accordingly, definitions of the terms should be understood on the basis of the substantial meaning and the entire description of the present specification instead of simple names of the terms.

The same reference number or numeral stated in the drawings attached to the specification refers to an element or component that performs materially the same function. For convenience of description and understanding, the same reference number or numeral is also used in different exemplary embodiments of the present disclosure. That is, even if components having the same reference numeral are illustrated in a plurality of drawings, the drawings do not refer to one embodiment.

In the specification and claims, the terms first, second, etc. may be used to distinguish one element from another element. These terms are only used to distinguish the same element or similar elements from another element, and these elements should not be limited by these terms. For example, a user order or arrangement order of elements combined with the terms first, second, etc. should not be limited by the terms. As necessary, the terms first, second, etc. may be interchangeably used.

As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Also, the terms, such as "module", "unit", or "part" should be understood as a unit that processes at least one function or operation and that may be embodied in a hardware manner, a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as a specific hardware.

In the specification, when it is described that a certain part is "connected" to another part, it should be understood that the certain part may be directly connected to another part or indirectly connected to another part via another part in the middle. In addition, when a certain part "includes" a certain component, this indicates that the part may further include another component instead of excluding another component unless there is no different disclosure.

Certain exemplary embodiments will be described in greater detail with reference to the accompanying drawings.

FIG. 1 is a block diagram illustrating a configuration of a broadcast transmitting apparatus 100 according to an exemplary embodiment.

As illustrated in FIG. 1, the broadcast transmitting apparatus 100 may include a generic packet generator 110, a frame generator 120, a signal processor 130, and a transmitter 140.

The generic packet generator 110 may generate a generic packet (GP), a baseband packet (BBP), or an L2 packet, which includes header and payload data, based on an input stream.

Here, the input stream may be a transport stream (TS), Internet packets (IP) (e.g., IPv4 and IPv6), MPEG media transport (MMT), a generic stream (GS), generic stream encapsulation (GSE), or the like. In addition, the header may include information on payload data contained in the corresponding GP and information on a packet contained in the corresponding GP. A generic packet (GP), a baseband packet (BBP), or an L2 packet may be referred to as different terms according to communication systems.

Examples of payload data contained in a GP may include, but is not limited to, an Internet protocol (IP) packet, a TS packet, a signaling packet, and/or a combination thereof. Here, the GP may refer to a unit packet required to map various types of input data to a physical layer.

In detail, the generic packet generator 110 may generate a packet including a header including a field indicating a type of payload data and a field indicating whether a corresponding generic packet delivers a complete input packet.

When a current packet is in a single packet mode for transmitting one service data unit (SDU), the generic packet header may further include a field indicating whether arbitrary feature or an option header is used and a field indicating a length of a least significant bit (LSB) of a payload in the current generic packet. Here, the field indicating whether arbitrary feature or an option header is used may include at least one of a field indicating whether a LABEL field is present in an option header, a field indicating whether an extension header is present after an option header, a field indicating whether a length of an extension header is long or short when the extension header is present, and a field indicating additional information for header compression in an option header in a current generic packet.

In addition, in a single packet mode, the generic packet header may further include at least one of a field indicating a length of a most significant bit (MSB) of a payload in a current generic packet, a field indicating whether a length of a payload in a current generic packet is long or short, and a field indicating whether feature or header extension of an arbitrary option header is used.

The option header may include at least one of a field for providing a sub stream address, a field for indicating a length of an extension header after the option header, and a field including additional information for recovery of a compression service data unit transmitted in a current generic packet.

When a current packet is in a segmentation mode for transmitting a segment of a service data unit, the generic packet header may further include a field indicating whether a payload of a current generic packet transmits a segment of a service data unit or transmits at least one complete service data unit.

In a segmentation mode, the generic packet header may further include at least one of a field indicating a length of a payload in a current generic packet, a field for providing a segment identifier of an input packet transmitted in a current generic packet, a field indicating whether the current generic packet transmits a last segment of an input packet, and a field indicating whether feature or header extension of an arbitrary option header is used.

In a segmentation mode, the generic packet header may further include at least one of a field indicating a length of a payload in a current generic packet, a field for providing a segment identifier of an input packet transmitted in a current generic packet, a field indicating whether a current generic packet transmits a last segment of an input packet, and a field indicating whether arbitrary feature or an option header is used.

In a segmentation mode, the generic packet header may further include at least one of a field for providing an identifier of a segmented input packet, a field indicating a length of a payload in a current generic packet, a field for providing a segment identifier of an input packet transmitted in a current generic packet, and a field indicating whether the current generic packet transmits a last segment of an input packet.

When a current packet is in a concatenation mode for transmitting a plurality of service data units, the generic packet header may further include a field indicating whether a payload of a current generic packet transmits segment of a service data unit or at least one complete service data unit.

In a concatenation mode, the generic packet header may further include at least one of a field indicating a length of a payload in a current generic packet, a field indicating the number of input packets included in a corresponding generic packet, a field indicating whether an option header is present, and a field indicating a length of an input packet connected to a payload of a current generic packet.

The frame generator 120 may generate a frame including a generic packet. Here, the generated frame may be a generic frame or a baseband frame (BBF). The generated frame may include a generic packet or an L1 packet. In the present disclosure, the generated frame will be referred to as a generic frame.

In detail, the frame generator 120 may arrange a plurality of generic packets including an IP packet and a header to generate a baseband frame with a size corresponding to a forward error correcting code. According to an exemplary embodiment, a generic packet (or a baseband packet) may be a TS packet, but it is not limited thereto as aforementioned.

Figure 2:
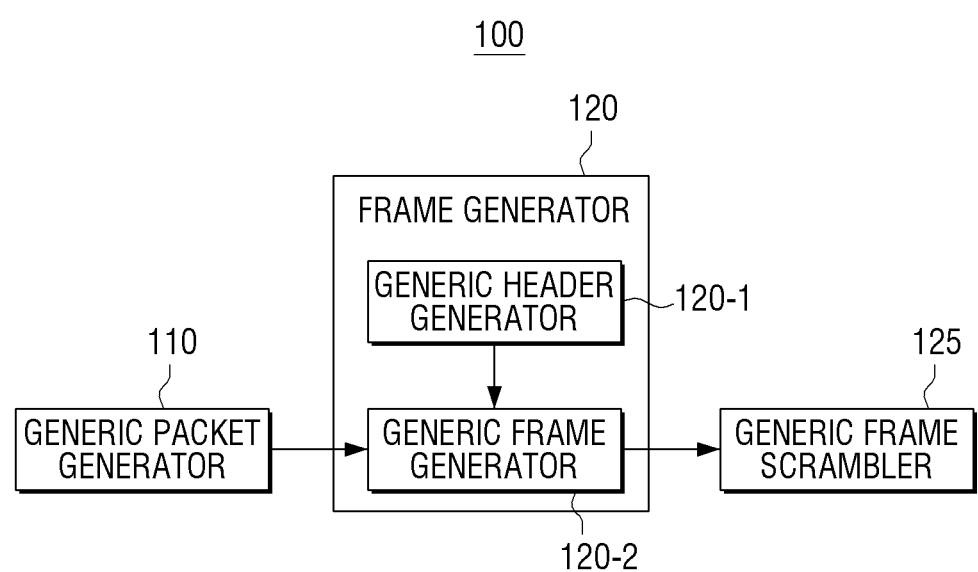
FIG. 2 is a detailed block diagram of a frame generator of a broadcast transmitting apparatus according to an exemplary embodiment.

FIG. 2 is a detailed block diagram of the frame generator 120 of a broadcast transmitting apparatus according to an exemplary embodiment.

As illustrated in FIG. 2, the frame generator 120 may include a generic header generator 120-1 and a generic frame generator 120-2. In addition, the frame generator 120 may transmit a generated baseband frame to a generic frame scrambler 125.

The generic packet generator 110 may generate a generic packet from various types of data for transmission over physical layer pipe (PLP) in relation to an input mode. Here, the generic packet may correspond to an L2 packet in an Open System Interconnection (OSI) 7 layer model. That is, the generic packet generator 110 may encapsulate a packet (e.g., an IP packet, a TS packet, etc.) input from an upper layer, e.g., Layer 2 of the OSI 7 layer model, to generate a generic packet.

The generic header generator 120-1 may generate a header to be inserted into a generic frame. Here, the header may include information on a generic frame.

In particular, when an input stream is a TS, the generic header generator 120-1 may generate a header containing information on the number of TS packets in a generic packet, the number of removed null packets, and so on. In addition, the header generated by the generic header generator 120-1 may include various information items, which will be described below.

The generic frame generator 120-2 may encapsulate a header generated from the generic header generator 120-1 with a generic packet output from the generic packet generator 110 to generate a generic frame.

The generic frame scrambler 125 may mix data stored in a generic frame in a random order to generate a scrambled generic frame before a forward error correcting code is added to each generic frame. The scrambled generic frame may be transmitted to a broadcast receiving apparatus 200 through a PLP and may be signal-processed. In this case, one PLP may include generic frames with a fixed size. That is, the input stream may be encapsulated as a generic frame for one PLP.

A PLP may refer to an independently processed signal path. For example, each service (e.g., video, extension video, audio, a data stream, etc.) may be transmitted and received through a plurality of RF channels. In this regard, a PLP may refer to a path for transmitting a service or refer to a stream transmitted through the path. The PLP may be positioned in slots distributed with time intervals on a plurality of RF channels or distributed with time intervals on one RF channel. That is, one PLP may be distributed and transmitted with time intervals on one RF channel or a plurality of RF channels.

A PLP structure may include Input mode A for providing one PLP and Input mode B for providing a plurality of PLPs. When Input mode B is supported, a robust specific service may be provided and one stream may also be dispersively transmitted to increase a time interleaving length, thereby obtaining a time diversity gain. In addition, when only a specific stream is received, a receiver may be powered off for the remaining time period to use the receiver with low power and, thus, the PLP structure may be appropriate to provide portable and mobile broadcast services.

Here, time diversity refers to a technology for obtaining fine transmission quality by synthesizing signals, received from a transmitting side, by a receiving side when the transmitting side transmits the same signal repeatedly a plurality of numbers of times with a constant time interval in order to reduce degrade in transmission quality in a mobile communication transmission line.

In addition, information to be commonly transmitted by a plurality of PLPs may be transmitted in one PLP to enhance transmitting efficiency. Assuming there are four PLPs, PLP 0 may perform this function and this PLP may be referred to as a common PLP. The other PLPs, i.e., PLP 1 to PLP 3, may be used to transmit data. These PLPs may be referred to as data PLPs. Using the common PLP and the data PLPs, for example, a home HDTV program may be received and an SDTV program may also be provided for portable and mobile states. In addition, a differentiated service may be provided by receiving broadcast in a fringe area where reception is poor as well as providing various broadcast services to a viewer through a broadcaster or a broadcast content provider.

Figure 3:
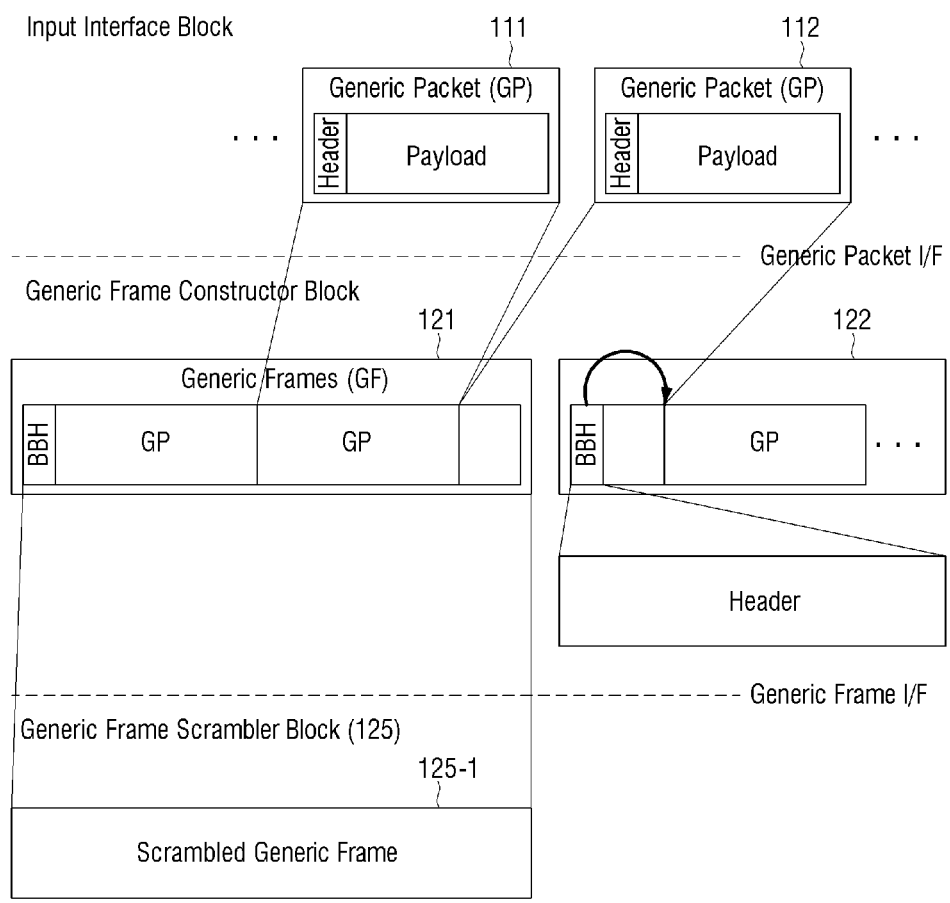
FIG. 3 is a diagram illustrating a generic packet, a generic frame, and a scrambled baseband frame, according to an exemplary embodiment.

FIG. 3 is a diagram illustrating a generic packet, a generic frame, and a scrambled baseband frame, according to an exemplary embodiment.

As illustrated in FIG. 3, when the generic packet generator 110 stores a TS packet in a payload and inserts a header to generate a plurality of generic packets 111 and 112, the frame generator 120 may group the plurality of generated generic packets 111 and 112 and insert a header to generate a plurality of generic frames 121 and 122. Here, each of the generic frames 121 and 122 may include a plurality of generic packets and/or some portions of the generic packets.

The generic frame scrambler 125 may randomly scramble each of the generated generic frames 121 and 122 to generate a plurality of scrambled generic frames 125-1. In addition, the generated scrambled generic frames may be signal-processed to be added with a forward error correcting code and transmitted through a PLP.

Referring back to FIG. 1, the signal processor 130 may signal-process a generated frame. In detail, the signal processor 130 may signal-process a generic frame to generate a transmission frame. In addition, the signal processor 130 may insert signaling information into a signaling region of a frame. The signaling region of the generic frame will be described below in detail.

The transmitter 140 may transmit the transmission frame signal-processed by the signal processor 130 to the broadcast receiving apparatus 200. Here, the signal-processed transmission frame may be a data stream type of frame including a plurality of PLPs including generic frames.

Accordingly, the transmitter 140 may modulate the data stream type of frame including a plurality of PLPs into an RF signal and transmit the RF signal to the broadcast receiving apparatus 200.

Hereinafter, a unit structure of a transmission frame generated by the broadcast transmitting apparatus 100 according to an exemplary embodiment will be described.

Figure 4A:
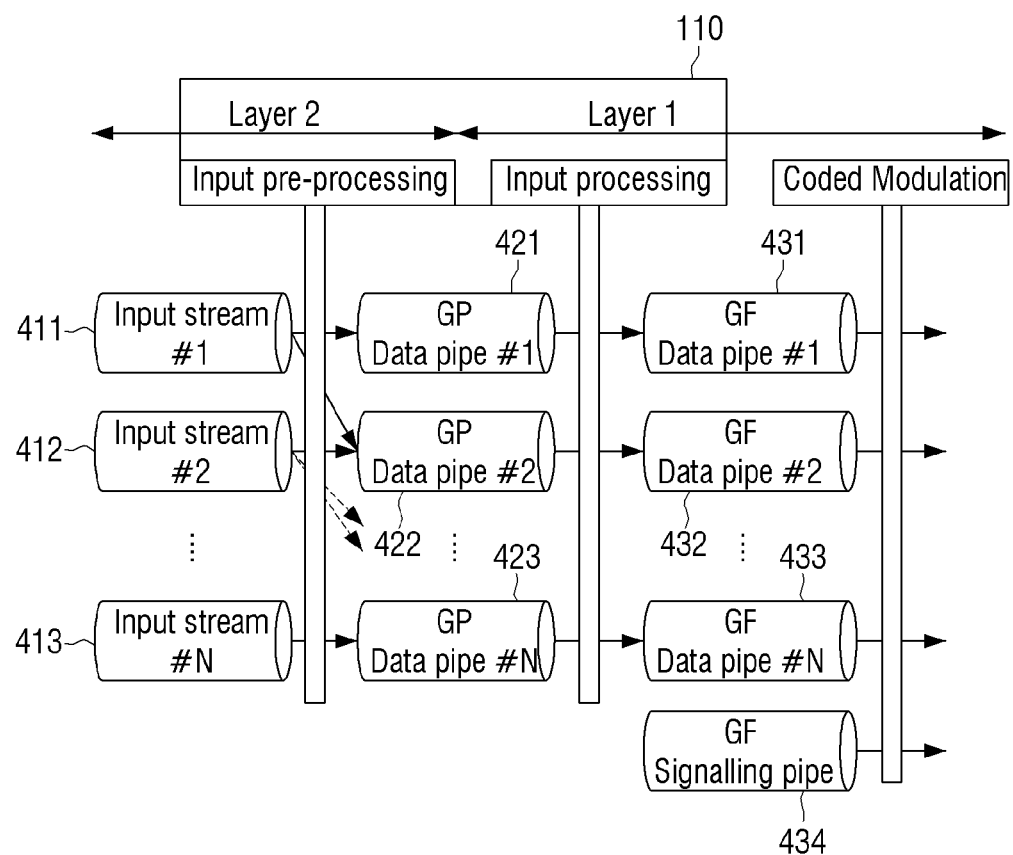
FIG. 4A is a diagram for explanation of a procedure of processing an input stream as a generic frame according to an exemplary embodiment.

FIG. 4A is a diagram illustrating a procedure of processing an input stream to generate a generic frame.

As illustrated in FIG. 4A, an input processing module in which an input stream is processed may be operated in a data pipe level. In detail, a plurality of input streams 411 to 413 may be processed to data pipes 421 to 423 of a plurality of generic packets through an input pre-processing procedure. The data pipes 421 to 423 of a plurality of generic packets (GPs) may be encapsulated to data pipes 431 to 433 of a plurality of generic frames CFs and scheduled as a transmission frame through an input processing procedure.

Figure 4B:
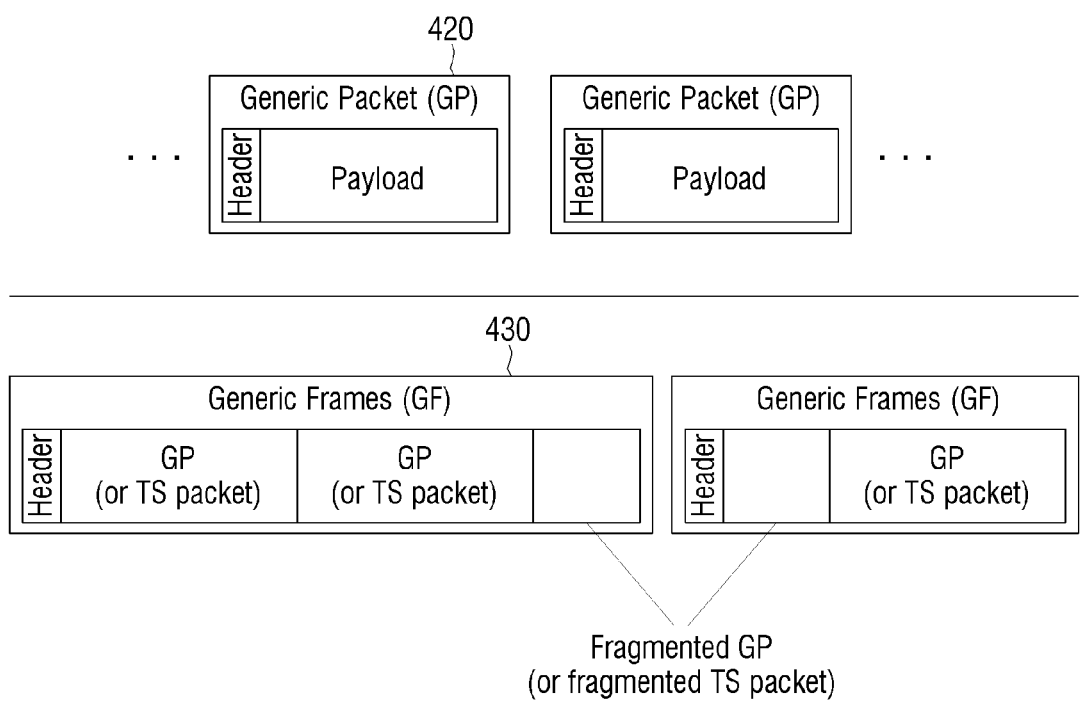
FIG. 4B is a diagram for explanation of a relationship between a generic packet and a generic frame according to an exemplary embodiment.

FIG. 4B is a diagram illustrating a relationship between a generic packet 420 and a generic frame 430.

As illustrated in FIG. 4B, a payload of the generic packet 420 may be a packet included in a TS, an IP stream, or another type of stream. In addition, the generic frame 430 may include a plurality of complete generic packets or some portions of the packets.

Figure 4C:
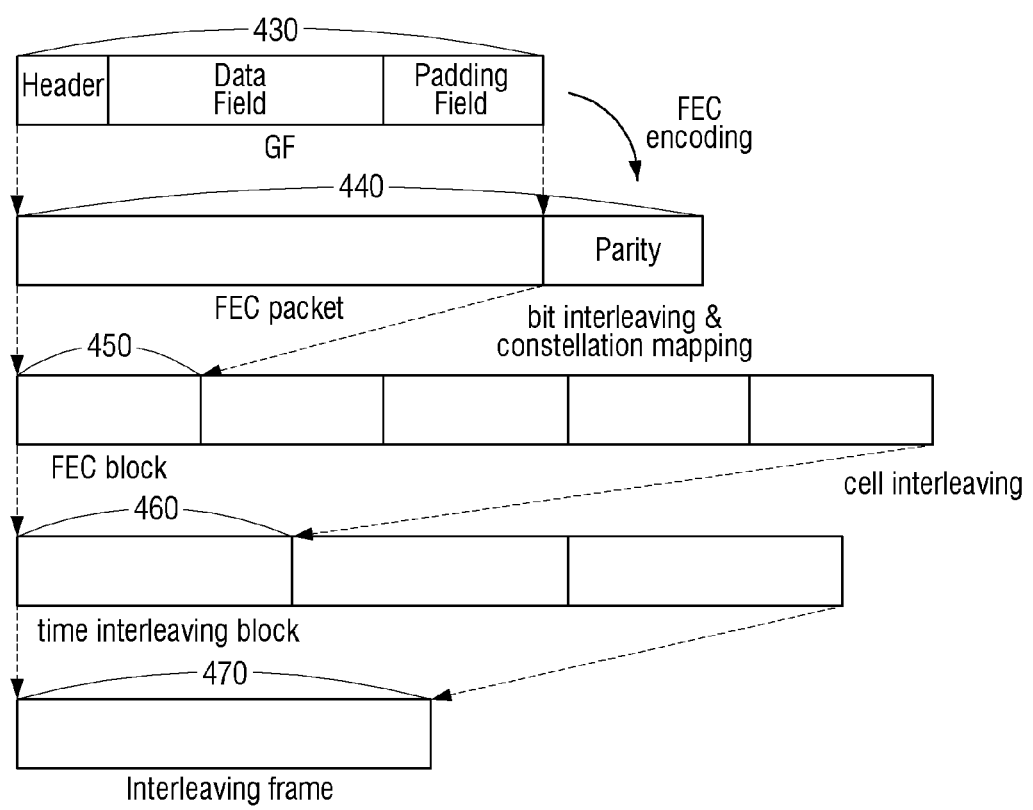
FIG. 4C is a diagram for explanation of a local frame structure for a physical layer pipe (PLP) according to an exemplary embodiment.

FIG. 4C is a diagram illustrating a local frame structure for each PLP.

As illustrated in FIG. 4C, the generic frame 430 may include a header, a data field, and a padding field.

The generic frame 430 may be added with parity through an FEC encoding procedure and processed as a GF FEC packet 440.

The GF FEC packet 440 may be processed as an FEC block 450 through a bit interleaving and constellation mapping procedure. A plurality of FEC blocks may be processed as a time interleaving block 460 through a cell interleaving procedure, and a plurality of time interleaving blocks may constitute an interleaving frame 470.

Figure 4D:
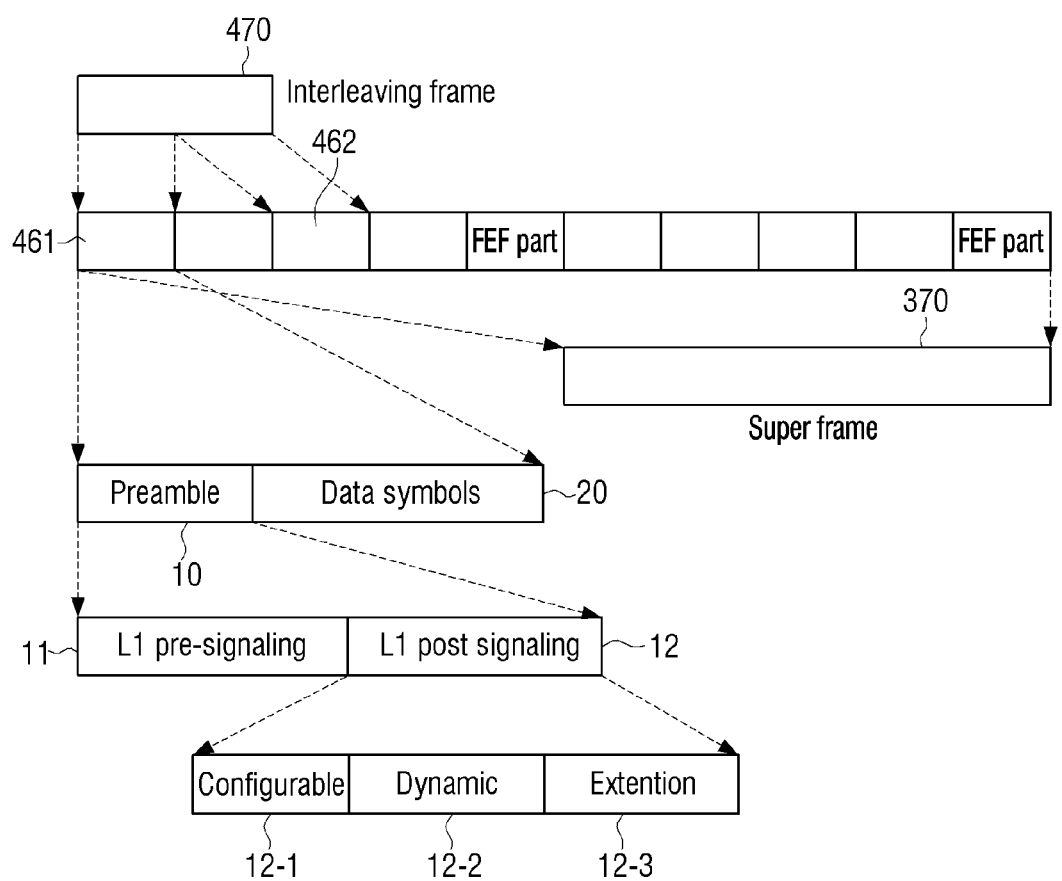
FIG. 4D is a diagram for explanation of a structure of an interleaving frame.

FIG. 4D is a diagram illustrating a structure of an interleaving frame.

As illustrated in FIG. 4D, the interleaving frame 470 may be transmitted through different transmission frames 461 and 462. A plurality of transmission frames and one or more FEF parts may form one super frame 370.

One transmission frame 461 may include a preamble symbol 10 and data symbols 20 for transmission of data.

The preamble symbol 10 may include an L1 pre-signaling region 11 and an L1 post signaling region 12. The L1 pre-signaling region 11 may provide a basic transmission parameter including parameters required to receive and decode the L1 post signaling and have a fixed length.

The L1 post signaling region 12 may include a configurable field 12-1 and a dynamic field 12-2.

The configurable field 12-1 may include information changeable to a super frame unit and the dynamic field 12-2 may include information changeable every frame unit.

In addition, the L1 post signaling region 12 may selectively include an extension field 12-3. Although not illustrated, the L1 post signaling region 12 may further include a CRC field and may further include an L1 padding field as necessary.

Thus far, the components of the broadcast transmitting apparatus 100 according to an exemplary embodiment have been described in detail. Hereinafter, components of the broadcast receiving apparatus 200 according to an exemplary embodiment will be described in detail.

Figure 5:
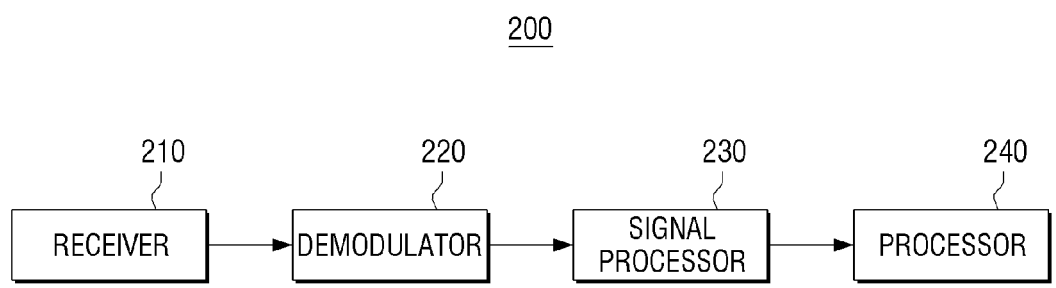
FIG. 5 is a schematic block diagram illustrating components of a broadcast receiving apparatus according to an exemplary embodiment.
Figure 6:
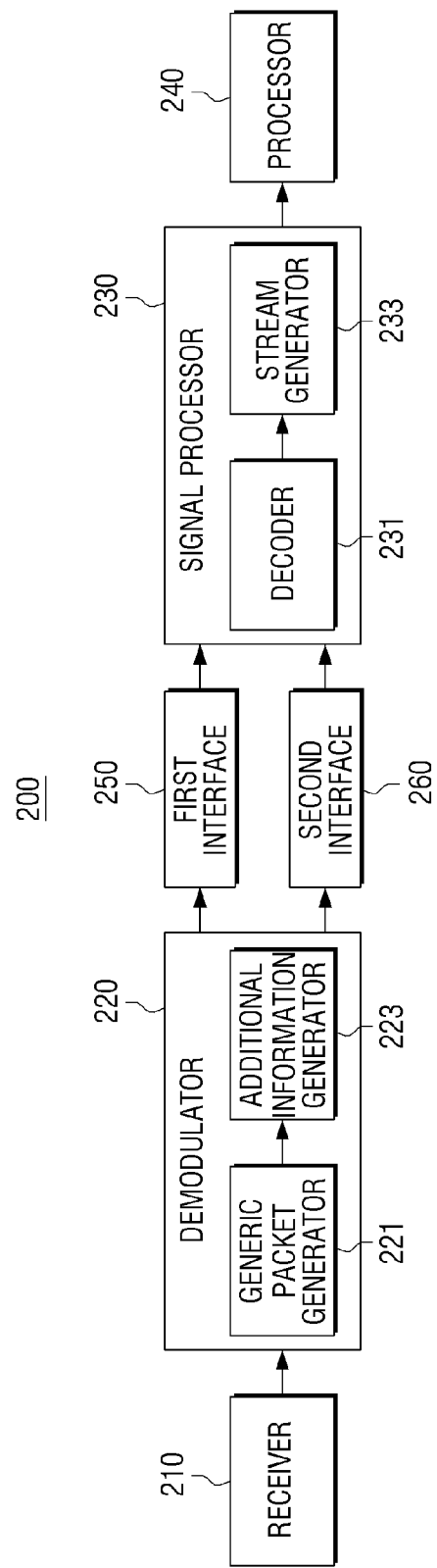
FIG. 6 is a block diagram illustrating components of a broadcast receiving apparatus according to another exemplary embodiment.

FIG. 5 is a schematic block diagram illustrating components of a broadcast receiving apparatus 200 according to an exemplary embodiment. FIG. 6 is a detailed block diagram illustrating components of a broadcast receiving apparatus 200 according to an exemplary embodiment.

As illustrated in FIG. 5, the broadcast receiving apparatus 200 may include a receiver 210, a demodulator 220, a signal processor 230, and a processor 240.

The receiver 210 may receive an RF signal type of data stream including a plurality of PLPs from the broadcast transmitting apparatus 100. The data stream may further include signaling information. Here, the signaling information may include information on an input type of an input stream input to the broadcast transmitting apparatus 100 and information on a data type mapped to at least one signal processing path. Here, the input on an input type of an input stream may be information indicating whether all signal processing paths in a received data stream are the same input type.

The demodulator 220 may demodulate a plurality of PLPs included in a data stream received from the receiver 210. As a result, the demodulator 220 may generate and output at least one generic packet corresponding to each of the plurality of PLPs and additional information on at least one generic packet.

The signal processor 230 may signal-process each generic packet output from the demodulator 220 based on additional information corresponding to each generic packet.

The processor 240 may output multimedia data about each generic packet signal-processed by the signal processor 230.

Among the components of the broadcast receiving apparatus 200, the receiver 210, the demodulator 220 and the signal processor 230 may be embodied as one chip and the processor 240 may be embodied as another chip.

However, the present disclosure is not limited thereto, and the receiver 210, the demodulator 220, the signal processor 230, and the processor 240 may be embodied as a single chip.

In detail, as illustrated in FIG. 6, the demodulator 220 may include a generic packet generator 221 and an additional information generator 223. The generic packet generator 221 may select a channel from a data stream of a type of an RF signal received through the receiver 210, restore timing/frequency errors of a signal of the selected channel, and perform restoration and error correction on distortion due to a multipath through an equalizer to generate at least one generic packet corresponding to each PLP from a plurality of PLPs included in the data stream.

In addition, the additional information generator 223 may generate additional information on each generic packet based on information that is not included in a header with reference to a header of at least one generic packet generated from each of a plurality of PLPs. Here, the additional information may be information used to restore or signal-process a payload in an upper layer among information items that are not included in header information of the generic packet. Accordingly, the additional information generator 223 may generate information used to restore or signal-process a payload in an upper layer among information items that are not included in header information of each generic packet, as additional information to be used for signal processing on each generic packet.

According to an exemplary embodiment, the additional information may include at least one of sync code information indicating beginning of each generic packet, valid information for determining whether output time of multimedia data of each generic packet is valid, error information, identification information on each of a plurality of PLPs, and sequence information of each of a plurality of PLPs.

The additional information may be positioned in front of a header of a generic packet and allocated with a size of 1 byte. That is, the sync code information indicating beginning of each generic packet included in additional information, valid information, error information, identification information, and sequence information may be allocated with a specific bit in 1 byte.

According to an exemplary embodiment, the sync code information indicating beginning of each generic packet, valid information, error information, identification information on each of a plurality of PLPs, and sequence information indicating a sequence of a plurality of PLPs may each be allocated with a size of 1 bit.

According to another exemplary embodiment, the sync code information indicating beginning of each generic packet, valid information, error information, identification information on each of a plurality of PLPs, and sequence information indicating a sequence of a plurality of PLPs may each be allocated with different sizes within 1 byte.

According to another exemplary embodiment, when the additional information is allocated with a size of 2 bytes, each information items included in the additional information may be allocated with different bit units according to a size allocated to the additional information.

The additional information may further include time information for output of multimedia data about each generic packet. In this case, the additional information may be allocated with a specific bit within 6 bytes.

Here, the time information may be information for output of multimedia data. The demodulator 220 may generate additional information based on time information of a frame received from the aforementioned broadcast transmitting apparatus 100 through the additional information generator 223 and time information consumed to decode each generic packet included in a corresponding frame through the signal processor 230.

Accordingly, the processor 240 may determine whether time information indicating output time of multimedia data of a generic packet is valid based on valid information included in the additional information, and upon determining that the corresponding time information is valid information, the processor 240 may output multimedia data of a generic packet based on the time information included in the additional information.

Figure 7:
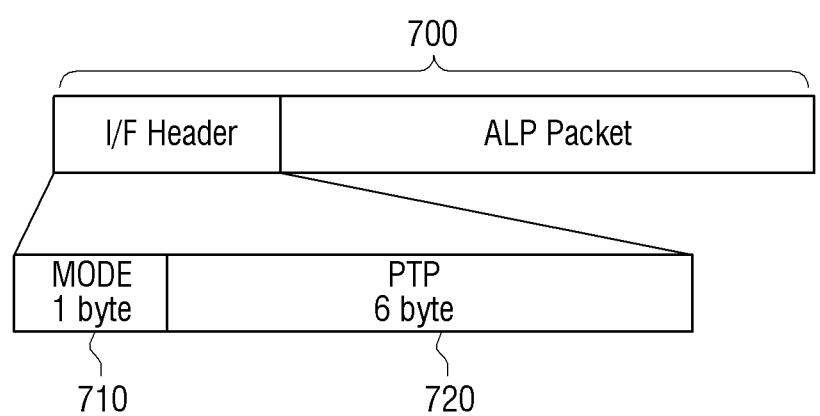
FIG. 7 is a diagram illustrating a structure of a generic packet according to an exemplary embodiment.

FIG. 7 is a diagram illustrating a structure of a generic packet according to an exemplary embodiment.

As illustrated in FIG. 7, a block 700 of a generic packet may include an I/F header and an ATSC 3.0 Link layer Protocol (ALP) packet.

The header of the block 700 of the generic packet may include additional information used for signal-processing the ALP packet. The additional information may include flag information with a size of 1 byte and PTP information with a size of 6 bytes.

In detail, a first block 710 including flag information with a size of 1 byte may include information used to restore or signal-process a payload in an upper layer among information items that are not included in a header of the generic packet.

In addition, a second block 720 including PTP information with a size of 6 bytes may include time information indicating output time of multimedia data of the generic packet.

Hereinafter, flag information and PTP information included in additional information will be described in detail.

Figure 8:
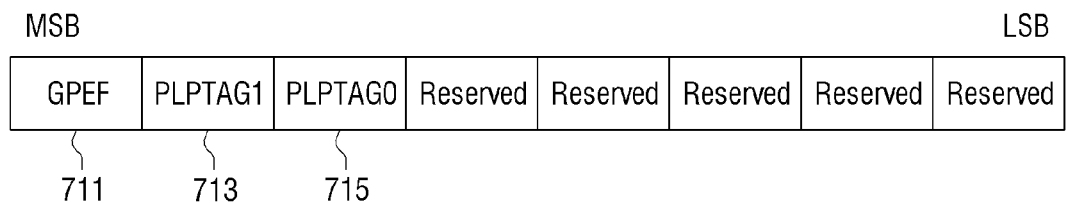
FIG. 8 is a diagram illustrating a flag structure included in additional information according to an exemplary embodiment.

FIG. 8 is a diagram illustrating a flag structure included in additional information according to an exemplary embodiment.

As illustrated in FIG. 8, flag information included in additional information on a generic packet may be allocated with a size of 1 byte. The flag information included in the additional information on a generic packet may include error information and PLP identification information which may each be allocated with a size of 1 bit.

In this case, a 1-1 block 711 of the first block 710 including flag information may include error information GPEF with a size of 1 bit, and 1-2 and 1-3 blocks 713 and 715 may include identification information PLPTAG 1 and PLPTAG 0 of a PLP with a size of 1 bit, respectively.

As described above, the signal processor 230 may signal-process each generic packet output from the demodulator 220 based on flag information contained in additional information corresponding to each generic packet.

According to an exemplary embodiment, flag information included in additional information of a first generic packet corresponding to PLP 0 may include error information. In this case, the signal processor 230 may decode the first generic packet in different decoding processing levels according to error information contained in flag information of the additional information of the first generic packet. For example, the decoding processing level may be pre-set as a first level, and when flag information of the additional information of the first generic packet includes error information, the signal processor 230 may decode the first generic packet in a higher decoding processing level than the decoding processing level pre-set as the first level according to error information, thereby minimizing an error rate in the case of decoding.

As another example, when flag information included in the additional information of the first generic packet among first to fourth generic packets respectively corresponding to PLP 0 to PLP 3 includes error information, the signal processor 230 may signal-process only the remaining second to fourth packets except for the first generic packet based on the error information.

Referring back to FIG. 6, the signal processor 230 may include a decoder 231 and a stream generator 233.

The decoder 231 may decode required data. In this case, the decoder 231 may acquire a parameter of an FEC scheme, a modulation scheme, etc. of data stored in each data region of a generic packet using signaling information included in a data stream and perform decoding. In addition, the decoder 231 may perform decoding based on additional information of a generic packet or calculate a position of required data based on data information contained in a header of a generic packet.

The stream generator 233 may process a generic frame received from the decoder 231 to generate multimedia data to be served.

For example, the stream generator 233 may generate a generic packet (or baseband packet) from an error-corrected generic frame based on various information items. In detail, the stream generator 233 may include de-jitter buffers which may re-generate accurate timing for restoring an output stream based on various information items. Accordingly, delay for sync between a plurality of PLPs may be compensated for.

Figure 9:
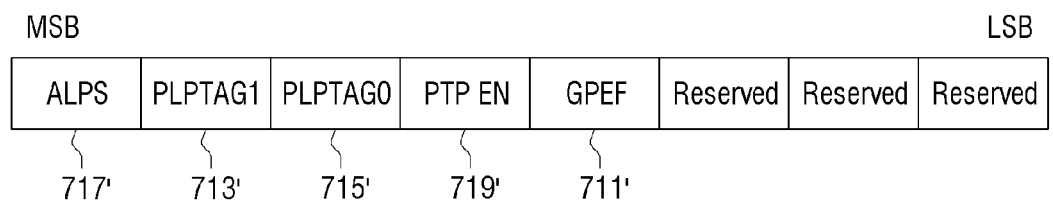
FIG. 9 is a diagram illustrating a flag structure included in additional information according to another exemplary embodiment.

FIG. 9 is a diagram illustrating a flag structure included in additional information according to another exemplary embodiment.

As illustrated in FIG. 9, flag information included in additional information on a generic packet may be allocated with a size of 1 byte. The flag information included in the additional information on a generic packet may include sync code information indicating start of the generic packet and valid information for determination of whether output time of multimedia data of the generic packet is valid as well as the error information and PLP identification information described with reference to FIG. 8.

In addition, each information item included in the flag information may be allocated with a size of 1 bit.

In this case, a 1-1 block 717' of a first block 710' including flag information may include sync code information ALPS indicating start of a generic packet and 1-2 and 1-3 blocks 713' and 715' may include identification information PLPTAG 1 and PLPTAG 0 of a PLP, respectively. In addition, a 1-4 block 719' of the first block 710' may include valid information PTP EN for determination of whether output time of multimedia data of a generic packet is valid and a 1-5 block 711' may include error information GPEF.

Accordingly, as described above, the signal processor 230 may decode each generic packet output from the demodulator 220 in different decoding processing levels according to error information included in flag information of additional information corresponding to each generic packet and output the decoded generic packet to the processor 240.

Accordingly, the processor 240 may output multimedia data about the generic packet output through the signal processor 230. In this case, the processor 240 may determine whether time information contained in PTP information of additional information is valid based on the valid information contained in flag information of additional information.

According to an exemplary embodiment, the processor 240 may determine that the time information included in the PTP information of the additional information is not valid when a value of the valid information included in the flag information is '0'. When a value of the valid information included in the flag information is '1', the processor 240 may determine that the time information included in the PTP information of the additional information is valid and output multimedia data about a generic packet based on the time information included in the PTP information of the additional information.

Hereinafter, PTP information included in additional information will be described in detail.

Figure 10:
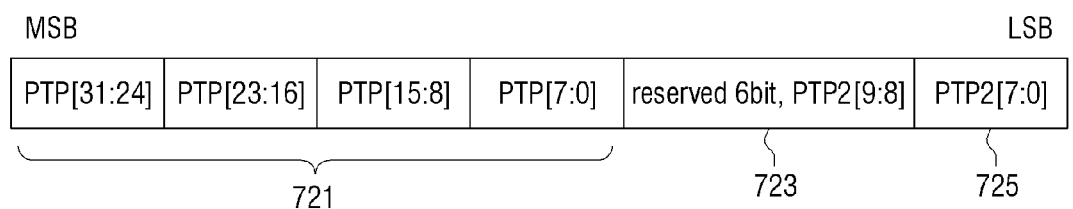
FIG. 10 is a diagram illustrating a structure of a PTP included in additional information according to an exemplary embodiment.

FIG. 10 is a diagram illustrating an example of a structure of PTP information included in additional information according to an exemplary embodiment.

As illustrated in FIG. 10, PTP information included in additional information on a generic packet may be allocated with a size of 6 bytes. The PTP information included in the additional information of the generic packet may include time information for output of multimedia data of the generic packet.

In detail, as illustrated, blocks 721 to 725 of the PTP information may include time information items set for respective time units.

According to an exemplary embodiment, a first block 721 of the PTP information 720 may include time information of a unit of 'second (s).' The second block 723 may include time information of a unit of 'millisecond (ms).' The third block 725 may include time information of a unit of 'Microsecond (µs)'.

Accordingly, upon determining that the valid information included in the flag information is valid, the processor 240 may output multimedia data of the generic packet based on the time information included in the PTP of the additional information.

As illustrated in FIG. 6, the broadcast receiving apparatus 200 may further include first and second interfaces 250 and 260 for outputting generic packet related data corresponding to each of a plurality of PLPs to the signal processor 230.

Figure 11:
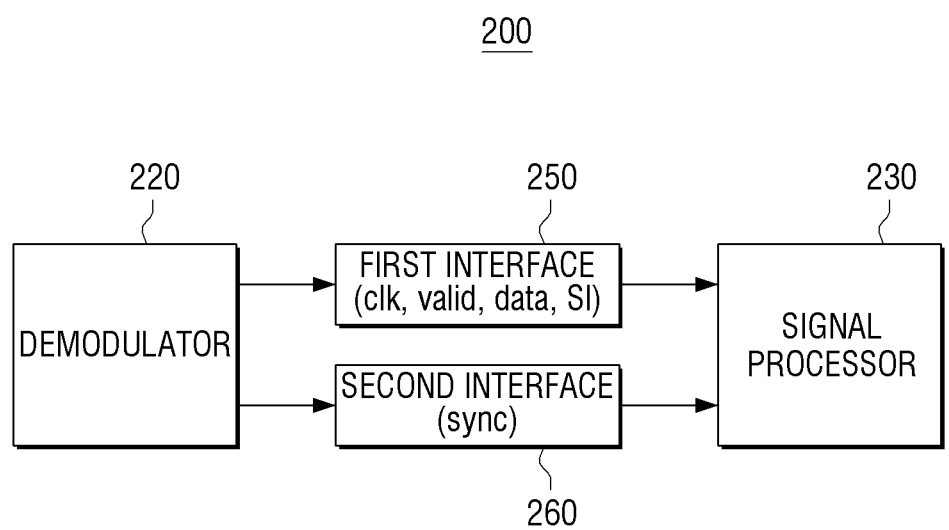
FIG. 11 is a diagram illustrating a broadcast receiving apparatus according to an exemplary embodiment.
Figure 12:
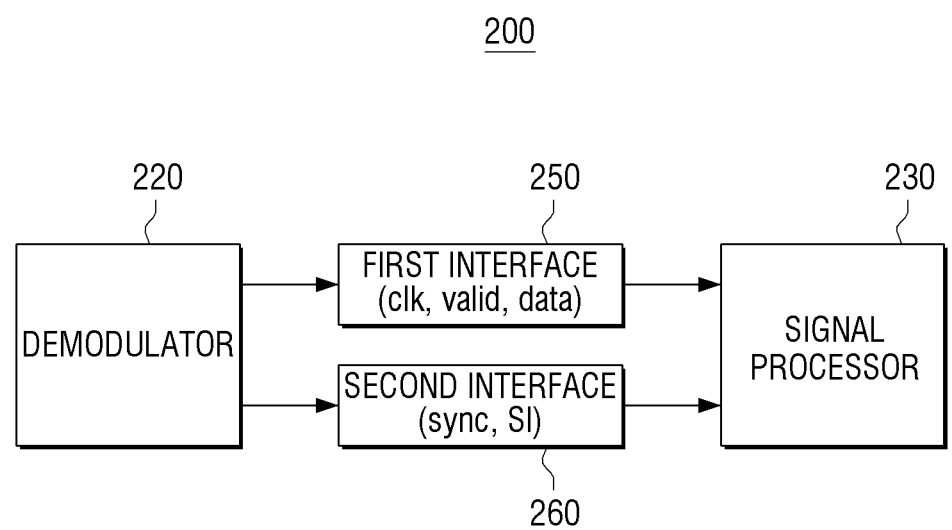
FIG. 12 is a diagram illustrating a broadcast receiving apparatus according to another exemplary embodiment.

FIG. 11 is a diagram illustrating a broadcast receiving apparatus outputting generic packet related data according to an exemplary embodiment. FIG. 12 is a diagram illustrating a broadcast receiving apparatus outputting generic packet related data according to another exemplary embodiment.

As illustrated in FIG. 11, based on additional information of a generic packet corresponding to each of a plurality of PLPs being generated by the additional information generator 223, the demodulator 220 may insert additional information into each generic packet and output at least one of generic packet data with the additional information inserted thereto, clock information, and valid information to the first interface 250.

According to an exemplary embodiment, the demodulator 220 may insert additional information into each generic packet and output generic packet data with the additional information inserted thereto, clock information, and valid information together to the first interface 250.

In addition, the demodulator 220 may output sync information indicating start of the generic packet with the additional information inserted thereto to the second interface 260.

Accordingly, the signal processor 230 may determine a start time point of the generic packet data with the additional information inserted thereto and a position of the additional information based on sync information received through the second interface 260, acquire additional information included in the generic packet data received through the first interface 250 based on the determination result, and signal-process the generic packet data based on the acquired additional information.

As illustrated in FIG. 12, the demodulator 220 may output at least one of generic packet related data, clock information, and valid information which respectively correspond to a plurality of PLPs demodulated by the generic packet generator 221 to the first interface 250.

According to an exemplary embodiment, the demodulator 220 may output the generic packet related data, the clock information, and the valid information which respectively correspond to a plurality of PLPs demodulated by the generic packet generator 221 together to the first interface 250.

The demodulator 220 may output at least one of additional information of each generic packet generated by the additional information generator 223 and sync information indicating start of each generic packet to the second interface 260.

Accordingly, the signal processor 230 may determine a start point of generic packet related information related to corresponding additional information based on sync information and additional information received through the second interface 260 and signal-process the generic packet related data received through the first interface 250 based on the determination result.

Thus far, components of the broadcast transmitting apparatus 100 and the broadcast receiving apparatus 200 according to the exemplary embodiments have been described in detail. Hereinafter, a method of processing a signal of the broadcast transmitting apparatus 100 and the broadcast receiving apparatus 200 according to an exemplary embodiment will be described in detail.

Figure 13:
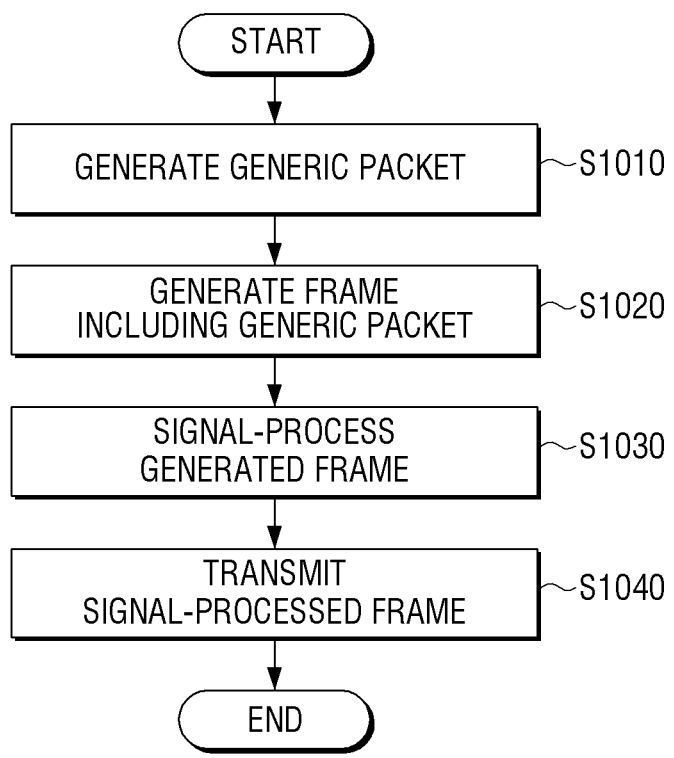
FIG. 13 is a flowchart of a signal processing method of a broadcast transmitting apparatus according to exemplary embodiment.

FIG. 13 is a flowchart of a signal processing method of a broadcast receiving apparatus according to exemplary embodiment.

As illustrated in FIG. 13, the broadcast transmitting apparatus 100 may generate a generic packet including payload data and a header based on an input stream (S1010).

Here, the input stream may be a transport stream (TS), Internet packets (IP) (e.g., IPv4 and IPv6), MPEG media transport (MMT), a generic stream (GS), generic stream encapsulation (GSE), or the like. In addition, the header may include information on payload data included in a corresponding generic packet and information on a packet included in a corresponding generic packet. A generic packet (GP), a baseband packet (BBP), or an L2 packet may be referred to as different terms according to communication systems.

In response to the generic packet being generated (S1010), the broadcast transmitting apparatus 100 may generate a generic frame including the generated generic packet (S1020). Then, the broadcast transmitting apparatus 100 may signal-process the generic frame (S1030). Then, the broadcast transmitting apparatus 100 may transmit the signal-processed frame to the broadcast receiving apparatus 200 (S1040). Here, the signal-processed frame may be a transmission frame of a data stream format including a plurality of PLPs including generic frames. Accordingly, the broadcast transmitting apparatus 100 may modulate the data stream including a plurality of PLPs into an RF signal and transmit the data stream modulated into the RF signal to the broadcast receiving apparatus 200.

Figure 14:
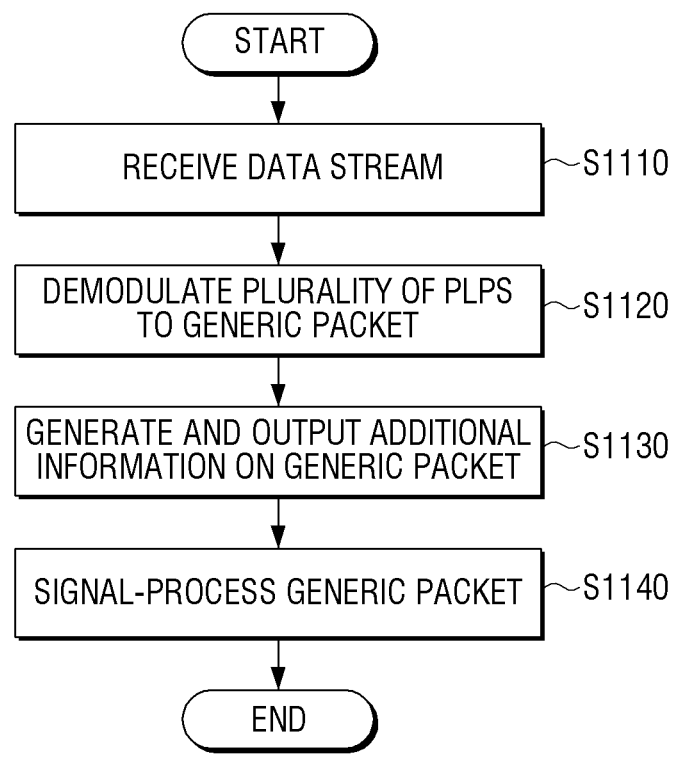
FIG. 14 is a flowchart of a signal processing method of a broadcast receiving apparatus according to an exemplary embodiment.

FIG. 14 is a flowchart of a signal processing method of a broadcast receiving apparatus according to an exemplary embodiment.

As illustrated in FIG. 14, in response to an RF signal type of data stream including a plurality of PLPs being received from the broadcast transmitting apparatus 100, the broadcast receiving apparatus 200 may demodulate the plurality of PLPs included in the received data stream to a generic packet (S1110 and S1120).

In response to the generic packet being demodulated to correspond to each of the plurality of PLP, the broadcast receiving apparatus 200 may generate and output at least one generic packet corresponding to each of the plurality of PLPs and additional information on the at least one generic packet (S1130).

Here, the additional information may be information used to restore a payload or to process a signal in an upper layer among information items that are not included in header information of the generic packet. According to an exemplary embodiment, the additional information may include at least one of sync code information indicating start of each generic packet, valid information for determination of whether output time of multimedia data of each generic packet is value, effort information, identification information of each of the plurality of PLPs, and rank information indicating a sequence of each of the plurality of PLPs.

The additional information may be positioned in front of a header of a generic packet and allocated with a size of 1 byte. In addition, sync code information indicating start of each generic packet, valid information, error information, identification information on each of a plurality of PLPs, and rank information indicating a sequence of each of the plurality of PLPs may each be allocated with a specific bit size.

According to an exemplary embodiment, sync code information indicating start of each generic packet, valid information, error information, identification information on each of a plurality of PLPs, and rank information indicating a sequence of each of the plurality of PLPs may each be allocated with a size of 1 bit.

According to another exemplary embodiment, sync code information indicating start of each generic packet, valid information, error information, identification information on each of a plurality of PLPs, and rank information indicating a sequence of each of the plurality of PLPs may be allocated with different bit sizes within a size of 1 byte.

According to another exemplary embodiment, when additional information is allocated with a size of 2 bytes, information included in the additional information may be allocated in different bit units according to a size allocated to the additional information.

In response to each generic packet and additional information generated in relation to each generic packet being output, the broadcast receiving apparatus 200 may signal-process a generic packet based on the output additional information (S1140).

In some embodiments, additional information of a first generic packet corresponding to PLP 0 may include error information. In this case, the broadcast receiving apparatus 200 may decode the first generic packet in different decoding processing levels according to error information included in additional information of the first generic packet. For example, the decoding processing level may be pre-set as a first level, and when the additional information of the first generic packet includes error information, the signal processor 230 may decode the first generic packet in a higher decoding processing level than the decoding processing level preset as the first level according to the error information of the additional information of the first generic packet, thereby minimizing an error rate in the case of decoding.

According to the following exemplary embodiment, the broadcast receiving apparatus 200 may generate and output a generic packet corresponding to each of a plurality of PLPs and additional information of each generic packet.

According to an exemplary embodiment, in response to additional information of a generic packet corresponding to each of a plurality of PLPs being generated, the broadcast receiving apparatus 200 may insert additional information into each generic packet and output at least one of generic packet related data with the additional information inserted thereto, clock information, and valid information to a first interface. However, the present disclosure is not limited thereto and, thus, in response to additional information of a generic packet corresponding to each of a plurality of PLPs being generated, the broadcast receiving apparatus 200 may insert additional information into each generic packet and output generic packet related data with the additional information inserted thereto, clock information, and valid information together to the first interface.

In addition, the broadcast receiving apparatus 200 may output sync information indicating start of the generic packet with the additional information inserted thereto through a second interface.

Accordingly, the broadcast receiving apparatus 200 may determine a start time point of the generic packet related data with the additional information inserted thereto and a position of the additional information based on sync information output through the second interface, acquire additional information included in the generic packet related data output through the first interface based on the determination result, and signal-process the generic packet related data based on the acquired additional information.

According to an exemplary embodiment, the broadcast receiving apparatus 200 may output at least one of generic packet related data corresponding to each of a plurality of PLPs, clock information, and valid information through the first interface. The broadcast receiving apparatus 200 may output generic packet related data corresponding to each of a plurality of PLPs, clock information, and valid information together through the first interface.

The broadcast receiving apparatus 200 may output at least one of additional information of each generic packet and sync information indicating start of each generic packet through the second interface.

Accordingly, the broadcast receiving apparatus 200 may determine a start time point of generic packet related data related to corresponding additional information based on sync information and additional information output through the second interface and signal-process generic packet related data output through the first interface based on the determination result.

According to an exemplary embodiment, the additional information may further include time information for output of multimedia data of a generic packet, and the time information may be allocated with a specific bit size within 6 bytes.

Here, the time information may be information for output of multimedia data. The broadcast receiving apparatus 200 may generate the time information based on time information of a frame received from the broadcast transmitting apparatus 100 and time information consumed to decode each generic packet included in a corresponding frame.

Accordingly, the broadcast receiving apparatus 200 may determine whether time information indicating output time of multimedia data of a generic packet is valid based on the valid information included in the additional information, and upon determining that the corresponding time information is valid, the broadcast receiving apparatus 200 may output the multimedia information of the generic packet based on the time information included in the additional information.

A non-transitory computer readable medium for storing a program for sequentially executing the signal processing method according to the present disclosure may be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

In addition, although the aforementioned block diagrams illustrating a transmitting apparatus and a receiving apparatus do not illustrate a bus, communication between components of the transmitting apparatus and the receiving apparatus may be performed. In addition, each of the transmitting apparatus and the receiving apparatus may further include a processor such as a central processing unit (CPU) and a microprocessor which perform the aforementioned operations.

The foregoing exemplary embodiments and advantages are merely exemplary and are not to be construed as limiting the inventive concept. The present teaching can be readily applied to various types of apparatuses. Also, the description of the exemplary embodiments is intended to be illustrative, and not to limit the scope of the claims, and many alternatives, modifications, and variations will be apparent to those skilled in the art.

What is claimed is:

1. A broadcast receiving apparatus comprising:
   a receiver configured to receive a data stream comprising a plurality of physical layer pipes (PLPs);
   a demodulator configured to output at least one generic packet corresponding to each of the plurality of PLPs and additional information on the at least one generic packet by demodulating the plurality of PLPs; and
   a signal processor configured to process the at least one generic packet based on the additional information,
   wherein the signal processor is further configured to, if error information is included in the additional information, decode one or more generic packets corresponding to the error information from among the at least one generic corresponding to each of the plurality of PLPs in a first decoding processing level, and decode remaining generic packet in a second decoding processing level, and
   wherein the first decoding processing level is different from the second decoding processing level.

2. The broadcast receiving apparatus as claimed in claim 1, wherein the additional information comprises information used to restore a payload of the at least one generic packet or to perform a signal process on a signal in an upper layer of a physical layer.

3. The broadcast receiving apparatus as claimed in claim 1, wherein the additional information comprises at least one of sync code information indicating start of the at least one generic packet, valid information indicating whether output time of multimedia data of the at least one generic packet is valid, the error information, identification information of each of the plurality of PLPs, and rank information indicating a sequence of each of the plurality of PLPs.

4. The broadcast receiving apparatus as claimed in claim 3, wherein each of the sync code information, the valid information, the error information, the identification information, and the rank information is allocated with a specific bit within 1 byte.

5. The broadcast receiving apparatus as claimed in claim 3, wherein:
   the additional information further comprises time information for output of the multimedia data of the at least one generic packet; and
   the time information is allocated with one or more bits within 6 bytes.

6. The broadcast receiving apparatus as claimed in claim 1, further comprising first and second interfaces configured to output data to the signal processor,
   wherein the demodulator is further configured to insert the additional information of the at least one generic packet into the at least one generic packet, output the at least one generic packet with the additional information inserted thereto, clock information, and valid information to the first interface, and output sync information indicating start of the at least one generic packet with the additional information inserted thereto to the second interface.

7. The broadcast receiving apparatus as claimed in claim 1, further comprising first and second interfaces configured to output data to the signal processor,
   wherein the demodulator is further configured to output the at least one generic packet, clock information and valid information to the first interface, and output at least one of sync information indicating start of the at least one generic packet and the additional information on the at least one generic packet to the second interface.

8. The broadcast receiving apparatus as claimed in claim 1, wherein the signal processor is further configured to, if valid information is included in the additional information, determine whether time information included in the additional information is valid based on the valid information, and if the time information is valid, output data of the at least one generic packet corresponding to each of the plurality of PLPs based on the time information.

9. A signal processing method of a broadcast receiving apparatus, the method comprising:
   receiving a data stream comprising a plurality of physical layer pipes (PLPs);
   outputting at least one generic packet corresponding to each of the plurality of PLPs and additional information on the at least one generic packet by demodulating the plurality of PLPs; and
   processing the at least one generic packet based on the additional information,
   wherein the processing comprises, if error information is included in the additional information, decoding one or more generic packets corresponding to the error information from among the at least one generic packet corresponding to each of the plurality of PLPs in a first decoding processing level, and decoding remaining generic packet in a second decoding processing level, and
   wherein the first decoding processing level is different from the second decoding processing level.

10. The method as claimed in claim 9, wherein the additional information comprises information used to restore a payload of the at least one generic packet or to perform a signal process on a signal in an upper layer of a physical layer.

11. The method as claimed in claim 9, wherein the additional information comprises at least one of sync code information indicating start of the at least one generic packet, valid information indicating whether output time of multimedia data of the at least one generic packet is valid, the error information, identification information of each of the plurality of PLPs, and rank information indicating a sequence of each of the plurality of PLPs.

12. The method as claimed in claim 11, wherein each of the sync code information, the valid information, the error information, the identification information, and the rank information is allocated with a specific bit within 1 byte.

13. The method as claimed in claim 11, wherein the additional information further comprises time information for output of the multimedia data of the at least one generic packet, and
   wherein the time information is allocated with one or more bits within 6 bytes.

14. The method as claimed in claim 9, wherein the outputting comprises:
   inserting the additional information of the at least one generic packet into the at least one generic packet;
   outputting the at least one generic packet with the additional information inserted thereto, clock information, and valid information through a first interface; and
   outputting sync information indicating start of the at least one generic packet with the additional information inserted thereto through a second interface.

15. The method as claimed in claim 9, wherein the outputting comprises:
   outputting the at least one generic packet, clock information, and valid information through a first interface; and
   outputting at least one of sync information indicating start of the at least one generic packet and the additional information on the at least one generic packet through a second interface.

\* \* \* \* \*